United States Patent [19]
Zeira et al.

[11] Patent Number: 5,932,342
[45] Date of Patent: Aug. 3, 1999

[54] OPTICAL DIFFUSERS OBTAINED BY FLUID PHASE MIXING OF INCOMPATIBLE MATERIALS

[75] Inventors: Eitan Zeira, Nashua, N.H.; John F. Coburn, Malden, Mass.

[73] Assignee: Nashua Corporation, Nashua, N.H.

[21] Appl. No.: 08/963,654

[22] Filed: Nov. 3, 1997

Related U.S. Application Data

[60] Provisional application No. 60/031,096, Nov. 14, 1996.

[51] Int. Cl.[6] ............................. B29D 11/00; G02B 5/02
[52] U.S. Cl. ..................... 428/327; 264/1.1; 264/1.6; 264/2.7; 264/1.38; 359/452; 359/599
[58] Field of Search ..................... 264/1.1, 1.36, 264/1.38, 1.6, 2.7; 359/443, 452, 599; 428/327

[56] References Cited

U.S. PATENT DOCUMENTS

| | | |
|---|---|---|
| 2,443,918 | 6/1948 | Lahousse et al. . |
| 2,584,441 | 2/1952 | Fredendall . |
| 2,901,337 | 8/1959 | Keutgen et al. . |
| 3,437,405 | 4/1969 | Northrop . |
| 3,646,174 | 2/1972 | Macri et al. ............................. 264/3 |
| 3,674,736 | 7/1972 | Lerman et al. . |
| 3,679,451 | 7/1972 | Marks et al. . |
| 3,737,337 | 6/1973 | Schnoring et al. . |
| 3,751,135 | 8/1973 | Clausen et al. . |
| 3,883,617 | 5/1975 | Krieg et al. . |
| 3,992,486 | 11/1976 | Lang . |
| 4,066,332 | 1/1978 | Kato et al. . |
| 4,105,292 | 8/1978 | Conder et al. . |
| 4,114,983 | 9/1978 | Maffitt et al. . |
| 4,140,369 | 2/1979 | Howland . |
| 4,152,618 | 5/1979 | Abe et al. . |

(List continued on next page.)

FOREIGN PATENT DOCUMENTS

| | | |
|---|---|---|
| 0 265 956 A2 | 5/1988 | European Pat. Off. . |
| 0 464 499 A2 | 6/1991 | European Pat. Off. . |
| 0269324 | 12/1992 | European Pat. Off. . |
| 0 294 122 B1 | 1/1993 | European Pat. Off. . |
| 0342283 | 2/1993 | European Pat. Off. . |
| 0 617 299 A2 | 3/1994 | European Pat. Off. . |
| 0 615 150 A2 | 9/1994 | European Pat. Off. . |
| 60-040134 A2 | 3/1985 | Japan . |
| 5113606 | 5/1993 | Japan . |
| 0540567 | 10/1941 | United Kingdom . |
| WO 95/12631 | 5/1995 | WIPO . |

OTHER PUBLICATIONS

Bentley et al., "An Experimental Investigation of Drop Deformation and Breakup in Steady, Two–Dimensional Linear Flows", J. Fluid Mech., 167:241–283, 1986.

Grace, "Dispersion Phenomena in High Viscosity Immiscible Fluid Systems and Application of Static Mixers as Dispersion Devices in Such Systems", Chem. Eng. Commun. 14:225–277, 1982.

IBM Technical Disclosure Bulletin, "Light Diffuser with Controlled Divergence", 700 I.B.M. Technical Disclosure Bulletin, 29:276–279, 1986.

(List continued on next page.)

*Primary Examiner*—Matthieu D. Vargot
*Attorney, Agent, or Firm*—Testa, Hurwitz & Thibeault, LLP

[57] ABSTRACT

A process for producing a light diffusing sheet material, and materials made therefrom. A dispersion of light scattering optically clear particles in an optically clear matrix during mixing of the constituent components of the diffuser in the liquid phase and then forming a film or sheet by, e.g., extrusion or casting, from which a screen suitable for displaying images projected thereupon may be constructed. The respective light dispersing and matrix components are chosen by their respective viscosities, interfacial surface energies, and refractive index differential. In an embodiment, it has been found that when the viscosity ratio of first (matrix) optically clear material to second (light dispersing) optically clear is between 0.05 and 10, the first optically clear material disperses or breaks the second optically clear material up into particles of a desired diameter during mixing or mastication of the two optically clear materials while in the fluid phase.

30 Claims, 4 Drawing Sheets

U.S. PATENT DOCUMENTS

| | | | |
|---|---|---|---|
| 4,165,153 | 8/1979 | Land . | |
| 4,166,255 | 8/1979 | Graham | 351/160 H |
| 4,174,883 | 11/1979 | Imataki et al. . | |
| 4,285,889 | 8/1981 | Parsons | 264/2.6 |
| 4,310,219 | 1/1982 | Jaccard . | |
| 4,361,382 | 11/1982 | Miyoshi et al. . | |
| 4,377,616 | 3/1983 | Ashcraft et al. | 428/213 |
| 4,379,617 | 4/1983 | Funakoshi et al. . | |
| 4,390,239 | 6/1983 | Huber . | |
| 4,443,814 | 4/1984 | Mori et al. . | |
| 4,452,508 | 6/1984 | Beales et al. . | |
| 4,506,045 | 3/1985 | Waniczek et al. | 524/31 |
| 4,606,609 | 8/1986 | Hong . | |
| 4,648,690 | 3/1987 | Ohe . | |
| 4,679,900 | 7/1987 | McKechnie et al. . | |
| 4,717,496 | 1/1988 | Brehmer et al. | 525/129 |
| 4,763,985 | 8/1988 | Bingham . | |
| 4,767,186 | 8/1988 | Bradley, Jr. et al. . | |
| 4,767,675 | 8/1988 | Cyr et al. | 428/515 |
| 4,814,377 | 3/1989 | Joyce | 525/53 |
| 4,822,856 | 4/1989 | Moore et al. | 525/197 |
| 4,843,129 | 6/1989 | Spenadel et al. | 525/240 |
| 4,863,646 | 9/1989 | Watanabe et al. | 264/15 |
| 4,876,296 | 10/1989 | Miller et al. | 523/200 |
| 4,889,888 | 12/1989 | Bassi et al. | 525/75 |
| 4,894,189 | 1/1990 | Dave et al. | 264/15 |
| 4,919,515 | 4/1990 | Hasegawa et al. . | |
| 4,923,280 | 5/1990 | Clausen et al. . | |
| 4,923,649 | 5/1990 | Hsieh et al. . | |
| 4,960,314 | 10/1990 | Smith et al. . | |
| 4,979,800 | 12/1990 | Clausen et al. . | |
| 4,983,016 | 1/1991 | Yamamoto . | |
| 4,991,933 | 2/1991 | Park . | |
| 5,011,244 | 4/1991 | Smith et al. . | |
| 5,012,274 | 4/1991 | Dolgoff . | |
| 5,016,950 | 5/1991 | Smith . | |
| 5,040,870 | 8/1991 | Ohno et al. | 359/443 |
| 5,111,337 | 5/1992 | Martinez | 359/443 |
| 5,118,579 | 6/1992 | Aharoni et al. . | |
| 5,139,879 | 8/1992 | Ahoroni et al. | 428/422 |
| 5,170,287 | 12/1992 | Ludwig, Jr. et al. | 359/452 |
| 5,178,955 | 1/1993 | Aharoni et al. | 428/421 |
| 5,179,440 | 1/1993 | Loban et al. | 358/87 |
| 5,188,777 | 2/1993 | Joesten et al. | 264/41 |
| 5,196,960 | 3/1993 | Matsuzaki et al. | 359/453 |
| 5,198,267 | 3/1993 | Aharoni et al. | 427/162 |
| 5,237,004 | 8/1993 | Wu et al. | 525/85 |
| 5,245,454 | 9/1993 | Blonder | 359/70 |
| 5,258,144 | 11/1993 | Yean et al. | 264/1.7 |
| 5,278,532 | 1/1994 | Hegg et al. | 345/7 |
| 5,279,689 | 1/1994 | Shvartsman | 156/220 |
| 5,292,783 | 3/1994 | Buchanan et al. | 524/37 |
| 5,300,942 | 4/1994 | Dolgoff | 345/32 |
| 5,307,205 | 4/1994 | Ludwig, Jr. et al. | 359/453 |
| 5,318,737 | 6/1994 | Trabert et al. . | |
| 5,330,824 | 7/1994 | Takimoto et al. | 428/201 |
| 5,346,954 | 9/1994 | Wu et al. | 525/85 |
| 5,349,503 | 9/1994 | Blonder | 362/31 |
| 5,357,372 | 10/1994 | Chen et al. | 359/637 |
| 5,384,658 | 1/1995 | Ohtake et al. | 359/707 |
| 5,402,324 | 3/1995 | Yokoyama et al. | 362/19 |
| 5,442,482 | 8/1995 | Johnson et al. | 359/619 |
| 5,457,572 | 10/1995 | Ishii et al. | 359/457 |
| 5,472,649 | 12/1995 | Chang et al. | 264/15 |
| 5,473,019 | 12/1995 | Siol et al. | 525/227 |
| 5,473,454 | 12/1995 | Blanchard | 359/69 |
| 5,548,670 | 8/1996 | Koike . | |

OTHER PUBLICATIONS

Scott et al., "Viscosity Ratio Effects in the Compounding of Low Viscosity, Immiscible Fluids into Polymeric Matrices", Polymer Engineering and Science, 36:1666–1674, 1996.

Wu, "Formation of Dispersed Phase in Incompatible Polymer Blends: Interfacial and Rheological Effects," Polymer Engineering and Science, 27:335–343, 1987.

OPTICAL DIFFUSERS OBTAINED BY FLUID PHASE MIXING OF INCOMPATIBLE MATERIALS

CROSS REFERENCE TO RELATED APPLICATIONS

This patent application claims priority of co-pending and commonly-assigned Provisional Patent Application No. 60/031,096, filed Nov. 14, 1996, the entire disclosure of which is incorporated herein by reference.

STATEMENT REGARDING FEDERALLY SPONSORED RESEARCH OR DEVELOPMENT n/a

BACKGROUND OF THE INVENTION

This invention relates to optical diffusers which may advantageously be used for front or rear projection screens in general, and in particular to optical diffusers comprising incompatible materials which are mixed in the fluid phase to subsequently form a light diffusive material in sheet form upon conversion to the solid phase.

The underlying mechanism by which projection screens work relies on a material which can scatter the projected image into the viewer's eye to produce what is called a real image. Each dot on the screen acts as a point source of light and all together they produce the images we see. A white screen scatters the light equally in all directions (i.e., Lambertian screen) and thus the image appears equally bright from all vantage points in front of the screen (The extent to which a projection screen can be viewed in the horizontal and vertical planes is generally known or referred to as angle of view (AOV)). A Lambertian screen would thus have an angle of view of 90°. However, the actual brightness (brightness is technically referred to as gain) is very low, since the light is scattered equally in all directions. In typical viewing situations, it is not necessary to project the image to the ceiling nor to the floor since it is unlikely that a viewer will be in those positions. In principle, the brightness of an image on a projection screen from any particular viewpoint can be increased by having the screen direct light preferentially towards that viewpoint rather than scattering light equally in all directions. Therefore, if one could take all the light that would otherwise be wasted in non-viewing regions and re-direct it to the viewing region, i.e., in front of the screen at eye level, this would make the viewing region have much more gain since the extra light is directed there at the expense of the non-viewing region.

Projection screens with such optical properties are referred to as asymmetric screens, i.e., they have an asymmetric "viewing cone", and diffusers with similar characteristics are known as asymmetric diffusers.

For applications such as front and rear television projection systems and brightness enhancing films for computer screens, the importance of obtaining a high gain image over a wide range of horizontal angles but over a narrower vertical angle of view (or, in other words, redirecting the light from the vertical to the horizontal) has been increasingly recognized. In practical terms, this means that the projected image obtained is as bright as possible, regardless of where one is seated in front of the screen. Various solutions to this problem have been presented in the art, such as lenticular lens arrays, embossed screens, etc.

Figure 1:
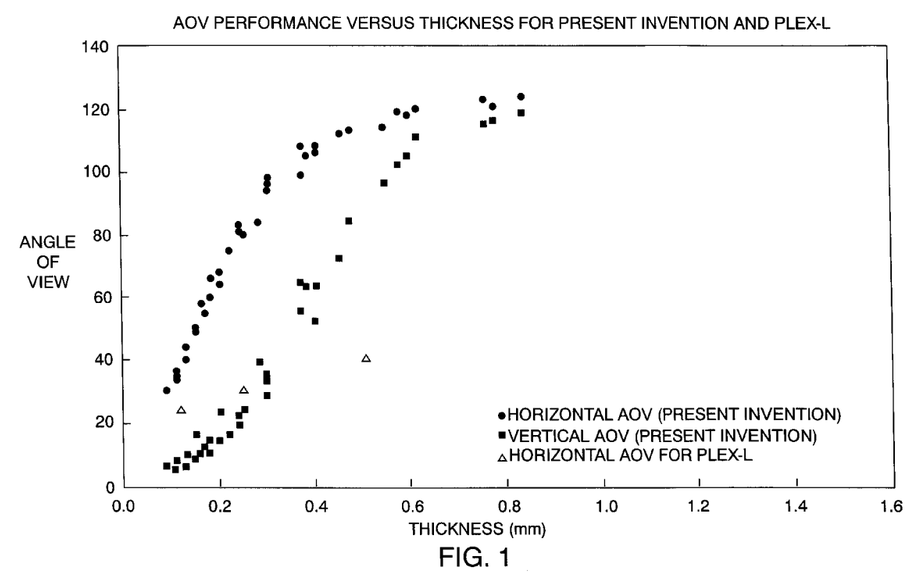
FIG. 1 is a graph of AOV vs. thickness comparing the PLEX-L material and a material according to an embodiment of the present invention.

A material available from Rohm and Haas (Philadelphia, Pa.) called PLEX-L™, made in accordance with U.S. Pat. Nos. 5,237,004 and 5,307,205, attempts to address some of the performance challenges for projection screens. The product is composed of crosslinked acrylic spherical particles dispersed in an acrylic matrix. The refractive index differential between the spherical particles and the matrix create the light redirecting action via refraction. AOV is thus controlled via the concentration of the spherical particles in the matrix, their $\Delta n$ (i.e., differential index of refraction) with respect to the matrix, the particle size and the overall thickness of the film as Matsuzaki et al. teach in U.S. Pat. No. 5,196,960. However, the PLEX-L material has a number of limitations which hinders its wide use in projection screens. As can be seen in FIG. 1, the AOV of PLEX-L varies with the thickness of the screen. A thicker film contains more spherical particles, and hence more scattering centers which lead to a higher angle of view of the resultant screen. However, the increase in screen thickness results in a loss of image definition. Also, it is desirable for a screen to have a high AOV as well as a high gain. These properties, however, are inversely related: high AOV screens tend to be relatively thick and have poor definition and lower gain, whereas low AOV screens tend to be thinner and have better definition and higher gain. It was found that elliptically-shaped particles can be used to create asymmetric optical properties by reducing the vertical AOV while keeping horizontal AOV constant, as described in U.K. Patent No. 540,567 and U.S. Pat. Nos. 4,165,153 and 4,983,016. In U.S. Pat. No. 5,473,454, it was noted that the PLEX-L material can be stretched, causing the spherical particles to attain an elliptical or ovoidal shape and thus preferentially refract the light in the horizontal direction at the expense of the vertical direction. The '954 patent teaches heating a thin sheet of PLEX-L material and stretching it in one direction while the maintaining the dimensions in the transverse direction. The choice of acrylic as the base material, however, is found to limit that stretch to a 2:1 aspect ratio of the spherical particles, which only enhances the gain slightly. Furthermore, the additional and separate stretching step increases the complexity of the manufacturing process, thus limiting the versatility of the end product.

BRIEF SUMMARY OF THE INVENTION

The present invention offers solutions to the shortcomings of the current technology by: minimizing the number of process steps required to manufacture the screens; offering a wide array of materials that can be used to make the screen providing much higher aspect ratios; and by achieving a high AOV at lower thicknesses and thereby increasing screen definition at a given AOV (see, e.g., FIG. 1). In an embodiment the viscosity ratio of optically clear plastic materials are leveraged to obtain a dispersion of one in the other to obtain a light diffusing material, which, when asymmetry is desirably imparted thereto, results in a screen material having superior optical properties, namely high gain and a wide horizontal AOV.

The invention relates in one embodiment to a process for producing a light diffusing sheet material comprising selecting a first optically clear material and a second optically clear material, wherein the first and second optically clear materials have a differential refractive index ($\Delta n$); are immiscible in one another; and desirably have a viscosity ratio that is between 0.05 and 10 as measured at a temperature at which the optically clear materials are at or near their liquefying point (the viscosity ratio defined as the viscosity of the matrix material divided by the viscosity of the dispersed phase material); dispersing the second material in the first material at that desired temperature, such as by vigorous mixing, melt mixing, compounding, mastication or a simple extrusion process of both materials; forming a film from the mixture, including hardening the film, and, where appropriate, orienting the material as an integral part of the sheet forming process to create asymmetrical optical properties. The selection of materials includes optically clear materials which are solid at room temperature and which, when heated, will become fluid at an elevated temperature such as thermoplastic polymeric materials, materials which are fluid at room temperature but are capable of subsequent conversion or polymerization to a solid form, either thermoplastic or thermoset as part of a subsequent step, and combinations of these materials. The invention further relates to sheet diffusers made according to the processes disclosed herein. In an advantageous embodiment the two optically clear materials have an interfacial surface energy between $1 \times 10^{-4}$ and $1 \times 10^{-2}$ N/m, and the dispersing step takes place at a temperature higher than the $T_g$ of the second optically clear material.

BRIEF DESCRIPTION OF THE SEVERAL VIEWS OF THE DRAWING

The invention will be more fully understood by reference to the following Detailed Description Of The Invention in conjunction with the following drawings, of which.

DETAILED DESCRIPTION OF THE INVENTION

This disclosure demonstrates making light diffusing films by creating a dispersion of light scattering optically clear particles in an optically clear matrix during mixing of the constituent components of the diffuser in the fluid phase and then forming a film or sheet by, e.g., extrusion or casting, from which a screen suitable for displaying images projected thereupon may be constructed. The respective light dispersing and matrix components are chosen by their respective immiscibility, interfacial surface energies, and refractive index differential. More particularly, it has also been found that when the viscosity ratio of first (matrix) optically clear material to second (light dispersing) optically clear is between 0.05 and 10, the first optically clear material disperses or breaks the second optically clear material up into particles of a desired diameter during mixing or mastication of the two optically clear materials while in the fluid phase.

"Optically clear" material is defined herein to mean a composition of matter that has a light transmission of at least 80%, preferably=85%, more preferably=90%. Depending on the particular application, optically clear materials for use in the invention may be liquid at room temperature, these liquids desirably being converted to solid form in the final sheet product. Advantageously, optically clear low molecular weight materials in liquid state which may be converted to solid state by crosslinking, heat or UV or electron beam curing, etc. may be employed. Optically clear materials which are liquid at room temperature may include, but are not limited to, monomers and prepolymers of the general classification esters, acrylics, urethanes, siloxanes and the like, two component systems including epoxies, polyesters and polyurethanes. Where, in this case, the material is to be oriented, for asymmetry for example, this can be achieved by extruding or pouring the material, at the appropriate stage in the setting process, onto a moving belt or web travelling somewhat faster than the extrusion rate, whereby the material is oriented in such pouring or extrusion but sets before the dispersed globules, which have become elongated as a result of such extrusion or pouring, are able to revert to a spherical shape.

These optically clear materials may also be solid at room temperature, e.g., thermoplastic polymers or copolymers which become fluid when heated. Optically clear materials which are solid at room temperature will be typically, but not exclusively, optically clear polymers and copolymers from the general classification of polyesters, polyolefins, acrylics, silicone polymers and elastomers, but may also include polystyrene, polycarbonate, polyamides; cellulose acetate, and cellulose acetate butyrate. Desirable properties may be achieved from combinations of materials which are solid or liquid at room temperature. Furthermore, one material may be thermoplastic and the other thermosetting, for example, where reaction rates at respective melt temperature permit, for example.

In a preferred embodiment, optically clear materials such as ethylene and propylene polymers and copolymers, polystyrenes and acrylics may be used.

The first optically clear material, when converted to a solid state, typically as part of an extrusion or casting process, forms the matrix or binder for the light diffusing screen which retains the dispersed particles of the second optically clear material. The first optically clear material is desirably durable, stable, self-supporting, and allows lamination to other materials, such as reflective backings.

The second optically clear material, dispersed in the first optically clear material as small particulate or ellipsoidal "lenses", directs the light where desired. The shape of the lenses, their size, and the Δn between the first and second optically clear materials determine the redirection of the light, as well as the gain of the screen comprising the presently disclosed light diffusing sheet material. Examples of suitable second optically clear materials are also application dependent, but will include typically those listed above as first optically clear materials. It will be understood that the tendency of a specific material to become either the matrix or the dispersed phase during the mixing process depends on a number of factors, including the proportions of the individual components. As noted above, this comment will apply to materials which are fluid at room temperature when mixed at elevated temperature with materials which are solid at room temperature. For example, optically clear siloxane-based resins including elastomers which are fluids at room temperature can be "injected" as the second optically clear polymer into a polyethylene or other polymer melt (e.g., first optically clear polymer) during extrusion or mastication to achieve dispersed particles of the siloxane material, as described herein, whereafter the siloxane can be polymerized to render the dispersed particles stable within the matrix. "Solid" is intended to imply that the particles of optically clear material have been sufficiently polymerized to effectively immobilize it within the polymer matrix, e.g., as a true solid, or as a semi-solid, e.g., gel. In a similar fashion, silicone elastomers can be blended with a minor proportion of polyethylene and then cured so that the polyethylene particles become the dispersed phase.

Although the two optically clear materials which form the matrix and dispersed particles are discussed herein generally as homogeneous materials, each could also be heterogeneous, i.e., mixtures of optically clear materials, chosen to meet the requirements disclosed herein, i.e., immiscibility, differential viscosity, refractive index, etc. To improve processing, effective amounts of compatibilizers known in the art such as, e.g., KRATON (Shell) block copolymers, may be used. Typically, compatibilizer is added at less than about 5 wt % based on the total weight of the mixture being processed. The compatibilizers may be polymers or copolymers, "copolymer" defined herein as a polymer created from more than one monomer. Desirably the compatibilizer has moieties chemically compatible with each of the components of the mixture into which the compatibilizer is added. For example, a matrix of ethylene ethylacrylate copolymer and a dispersed phase of polystyrene may be compatibilized by the addition of a small amount of a styrene/acrylic copolymer compatibilizer. Other compatibilizers which may be used include zinc stearate and olefin waxes.

Figure 3:
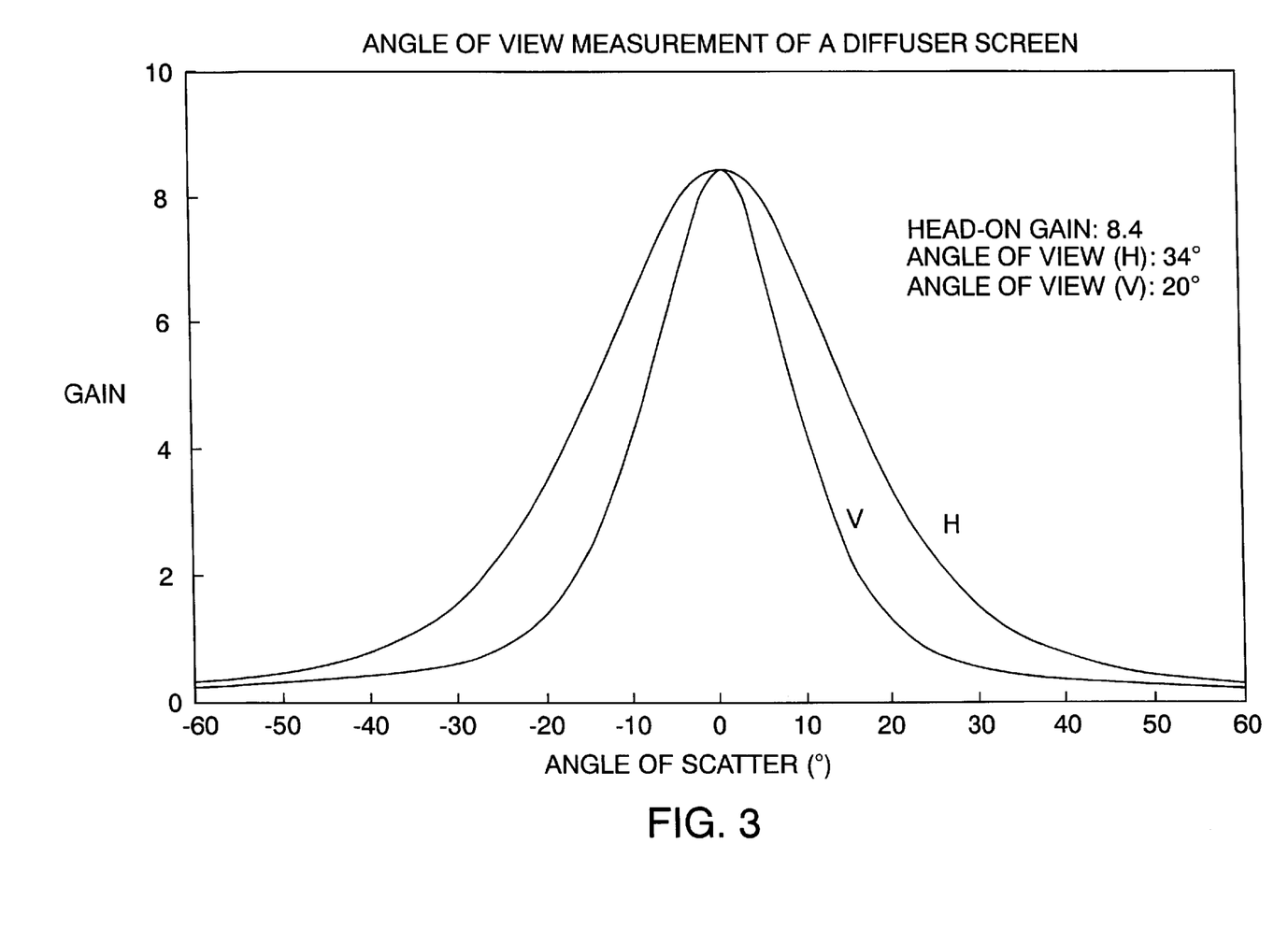
FIG. 3 depicts an AOV measurement curve of a diffuser screen typical of oriented PLEX-L.

In this disclosure, reference is made to "angle of view", or "AOV" (See FIG. 3). The term "angle of view" as used herein refers to the range of viewing angles of observers relative to a diffusing screen or a rear projection screen over which the apparent brightness of the screen is within 50% or more of the apparent brightness to an observer viewing the screen at right angles assuming that the light incident on the screen is incident along the normal to the screen. This figure is often referred to as "full width half maximum" or "fwhm". In the Examples set out below, the angle of view was measured by illuminating a small area of the screen material by a laser beam (although some other collimated light beam may be used) directed normally to the plane of the screen and measuring the light reflected from that small area over a range of angles. Furthermore, the expression "angle of view for transmission" as used herein means "angle of view" defined as above for a screen of light-diffusing material illuminated by a projector or the like disposed on the opposite side of the plane of the screen from the observer, i.e., for a rear-projection screen while the expression "angle of view for reflection" means "angle of view" defined as above for a screen of light reflective material illuminated by a projector or the like disposed on the same side of the plane of the screen as the observer, i.e., for a front projection screen.

The particle size and concentration of the dispersed phase in the matrix, as well as the Δn of the two optically clear materials, will determine the light diffusive properties of the screen. Within thickness limitations, the AOV is found to be directly proportional to the concentration and Δn and inversely proportional to the particle size at the dispersed phase as shown in U.S. Pat. No. 5,196,960. It has been found that Δn values of 0.2–0.005, preferably 0.1–0.007, provides the desired optical properties. The particle size for the dispersed phase ranges from about 1 to 50μ, desirably about 2 to 30μ, and more desirably about 2 to 15μ. More highly asymmetric material particles of larger volume, when oriented, will desirably have a minor dimension in the range of about 2 to 10μ.

The material is desirably processed via vigorous mixing or mastication of the optically clear material components, at a temperature at which the first and second optically clear materials are at or near their liquefying point. Any conventional polymer processing apparatus capable of providing the proper mixing may be used, for example, Banbury mixer; single or twin screw extruder; Hobart mixer, etc. For example, one embodiment employs a twin screw extruder to disperse the second optically clear material in the first and produce masterbatch pellets, which may then be loaded into a melting and conveying device (such as a single screw extruder outfitted with a die) to produce a light diffusing sheet material. In this scenario since the raw materials and the masterbatch are solids, they may be simply loaded into the extruder hopper, simplifying manufacture of the material. In another embodiment of the invention, a single screw extruder with a cavity transfer mixer is utilized to both mix and extrude the resins in one single process.

The use of one or more optically clear materials which have a $T_g$ lower than room temperature (i.e. are liquid at room temperature) are, as noted above, contemplated to be within the scope of the present disclosure. Solid/liquid combinations have been outlined previously. Liquid/liquid combinations, that is material combinations which are liquid at room temperature, can be mixed as described at room temperature such that one disperses within the other as small droplets; the mixture is then cast as a thin film onto a convenient substrate such as polyester, and at least the matrix material is then converted to a substantially solid film by, for example, polymerization (or condensation) using heat, UV, electron beam or other curing method. The resulting film may remain attached to the substrate or subsequently be separated from it.

Additional processing steps may be incorporated. For example, when the material which forms the light diffusing particles in the liquid phase is a solid at room temperature, it can be advantageous for this to be incorporated into the blending/dispersing process step (b) as small particles or pellets. This enables a uniform dispersion to be created quickly and can reduce the time and energy required to produce particles of the required final size. Clearly this can be advantageous when using materials which are thermally reactive or lacking in thermal stability. The film forming step may incorporate or be followed by a process which "distorts" the generally spherical shape of the dispersed phase to be ellipsoidal or otherwise elongate and in this way create asymmetric optical properties. While in the fluid state and relatively viscous, this can be achieved by orientation, for example by force or by drawing the fluid material through a die orifice or other restraint. However, the material must be converted to a solid typically by cooling or polymerization to ensure that the asymmetry is not lost due to relaxation phenomena. Alternatively the material may be subsequently oriented as described in U.S. Pat. No. 4,983,016 or U.S. Pat. No. 5,473,454, the entire disclosures of which are incorporated herein by reference.

Figure 4:
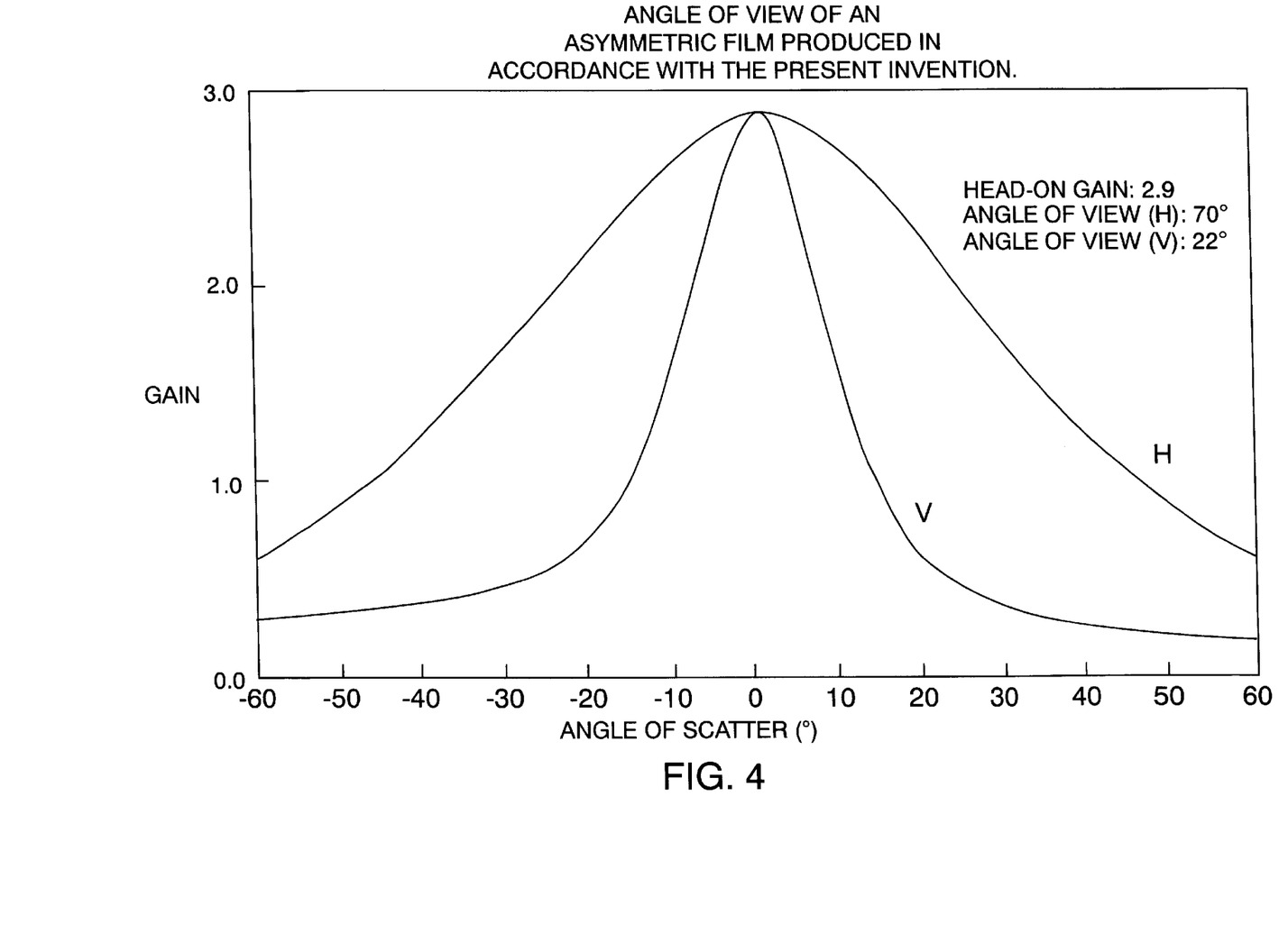
FIG. 4 depicts an AOV measurement curve of an asymmetric film produced in accordance with an embodiment of the present invention.

In an advantageous embodiment, the first and second optically clear materials are processed using a single screw extruder outfitted with a cavity transfer mixer and a slot die to disperse the second optically clear material in the first, and extrude the melt into a sheet form all in a single step. More preferably, the sheet emerging from the sheet die is processed onto a take up roll operating at a faster rate than the speed at which the sheet emerges from the sheet die, thereby stretching the sheet in the machine direction and imparting asymmetry to the second optically clear particles dispersed in the matrix (first optically clear material) to result in a high horizontal AOV light diffuser with a high gain and a lower vertical AOV (see FIG. 4).

An alternative to sheet extrusion and orientation to create an asymmetric material is to extrude the material as a tube and expand the tube to a larger diameter by differential pressure which, in conjunction with haul-off ratio, enables an optimum of radial and longitudinal orientation to be achieved. Subsequently the tube is slit to form a sheet of material with asymmetric optical properties but, by comparison with the more conventional sheet process, no edge effects exist.

FIG. 1 demonstrates the advantages of light diffusing materials according to the present disclosure (data points are a obtained from measurements of material as shown in Table 2, below), in comparison to the PLEX-L material. It can be seen that the optical performance of the present materials is superior to the PLEX-L material, although the latter contains 40% dispersed particles, compared to the material of Examples 1 and 2 (20% or 30% dispersed particles).

The viscosity energy relationship between the two material components of the diffuser disclosed herein will be better understood by referring now to the drawings.

Figure 2:
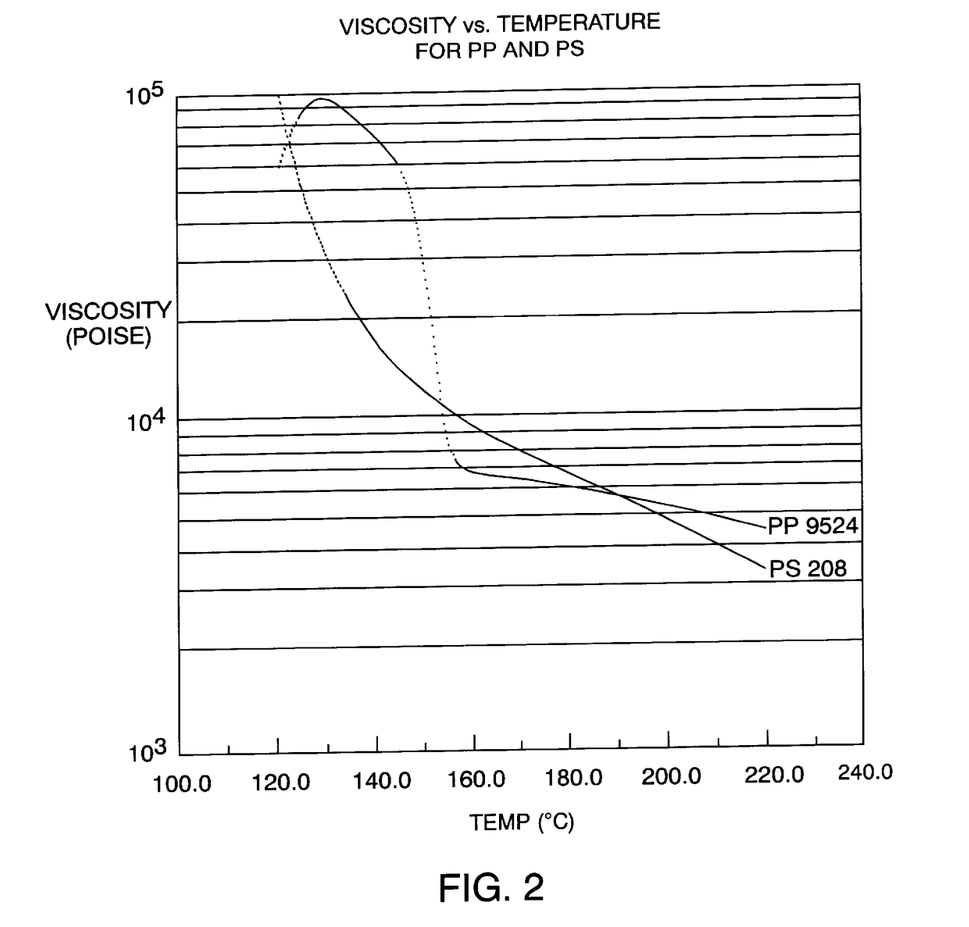
FIG. 2 is a viscosity vs. temperature curve of optically clear polypropylene ("PP"), and optically clear polystyrene ("PS")

FIG. 2 depicts the viscosity vs. temperature curve of optically clear PP9524 (Exxon Chemical), and optically clear polystyrene (Huntsman 208), a favorable situation in which polypropylene is used as the host or matrix material and polystyrene as the dispersed phase. FIG. 2 shows PP9524 (PP) having a higher viscosity than PS below 150° C., and a lower viscosity above 160° C. Within the zone where the viscosities of the two materials are similar, acceptable size PS spherical particles can be generated and a diffuser can be produced by dispersing the PS in the PP via melt mixing. At 180° C., both viscosities are in the range which normal single screw extrusion through a die can take place. At 180° C., the viscosity ratio of the two materials is 0.8. When extruded at that temperature, the minor component of the mixture will break up into spherical particles averaging several microns in size. The size of the spherical particles will vary depending on the concentration of the dispersed phase as well as the viscosity ratio, and to some extent the process conditions. The higher the concentration and the lower the viscosity ratio, the higher the size of the dispersed phase particles. The viscosity ratio can be changed by varying the extrusion temperature.

The ratio of viscosity of matrix to viscosity of dispersed phase is the measured value of interest. A viscosity ratio of about 0.3 produces roughly 1–2$\mu$ spherical particles when the concentration is 10% dispersed phase and 3–4$\mu$ spherical particles for a 20% dispersed phase. Reducing the viscosity ratio to 0.1 roughly doubles the size of the spherical particles while increasing it to 2.0 results in submicron spherical particles for similar concentrations.

EXAMPLE 1

Light diffusing materials in which polypropylene formed the matrix material with polystyrene as the dispersed phase were produced as follows: Escorene polypropylene PP9524 was compounded in bulk with Crystal polystyrene 207 (Huntsman) in the ratio 70:30 in a Leistritz twin screw extruder.

Pellets from this process were extruded into sheet through a 2" single screw Francis Shaw extruder fitted with a 16" sheet die with a die gap of 1 mm. The resulting sheet was oriented by varying the haul-off conditions. The haul-off equipment consisted of a 3-roll stack with independent temperature and speed controls and separately controlled nip rolls. Orientation could be carried out both above and slightly below the $T_g$ of the matrix material. The results are summarized in the following Table 1.

TABLE 1

| Film | Thickness | Draw Ratio | AOV (H) | AOV (V) | Gain | Draw Type |
|---|---|---|---|---|---|---|
| 1 | 0.17 mm | 5.9 | 70 | 22 | 2.9 | Above $T_g$ |
| 2 | 0.69 mm | 1.5 | 120 | 116 | 0.6 | Above $T_g$ |
| 3 | 0.25 mm | 4.0 | 90 | 42 | 1.6 | Above and below $T_g$ |
| 4 | 0.26 mm | 3.8 | 94 | 42 | 1.6 | Above $T_g$ |
| 5 | 0.36 mm | 2.8 | 112 | 80 | 1.0 | Above $T_g$ |

EXAMPLE 2

Raw materials as in Example 1 were fed to a 40 mm extruder fitted with a cavity transfer mixer, 8 inch slot die set at 1.5 mm utilizing the same haul-off set-up described in Example 1. The cavity transfer mixer was fitted with 9 vanes. This setup enabled the separate compounding step to be eliminated. Comparison of electron micrographs of sections of material taken from Examples 1 and 2 showed a similar mean particle size (5$\mu$) with material from Example 2 showing a lesser variation in particle size. The polystyrene percentages were 30 (as Example 1) and 21. Optical properties of sheet materials produced through the above process are summarized in Table 2.

TABLE 2

| Sample | Polystyrene % | Thickness mm | AOV (H) | AOV (V) | Gain |
|---|---|---|---|---|---|
| 1 | 21 | 1.47 | 124 | 124 | 0.48 |
| 2 | 21 | 0.37 | 99 | 64 | 1.04 |
| 3 | 21 | 0.28 | 84 | 39 | 1.57 |
| 4 | 21 | 0.15 | 50 | 16 | 5.72 |
| 5 | 30 | 0.77 | 121 | 116 | 0.55 |
| 6 | 30 | 0.47 | 113 | 84 | 0.76 |
| 7 | 30 | 0.40 | 108 | 63 | 0.93 |
| 8 | 30 | 0.30 | 96 | 34 | 1.49 |
| 9 | 30 | 0.24 | 83 | 22 | 2.32 |
| 10 | 30 | 0.18 | 66 | 14 | 4.20 |
| 11 | 30 | 0.18 | 60 | 10 | 5.62 |
| 12 | 30 | 0.13 | 40 | 6 | 12.73 |

EXAMPLE 3

To demonstrate an embodiment of the invention in which optically clear component materials for making diffusers in accordance with the disclosure were used, the following procedure was followed. 45 g of Escorez 5300 (a hydrocarbon (paraffinic) resin) were dissolved in 105 g toluene. 45 g of that solution was blended with 72 g of Radcure 754 (UCB) curing agent and 15 g of Sartomer SR9003B, a propoxylated neopentyl glycol diacrylate material, and 5 g of Daracur 1173 (Ciba-Geigy). The entire mixture was blended vigorously and allowed to stabilize over a period of 2 days, at which time a 4 mils coating on release paper was made and cured for 40 seconds under a high energy (3 amp) UV lamp in an Ashdee unit. A screen material were the resulting angle of view of 36° was obtained.

EXAMPLE 4

Another light diffusing material in accordance with the disclosure was made as follows. A mixture of 43 g each of SR209 and SR339 polyethylene dispersion (from Daniel Products, Jersey City, N.J.), Daracure 1173 (10.5 g) and FC430 (a fluorinated polyether surfactant from 3M) was prepared and 4 g of SL630 (a polyolefin-acrylic dispersion from Daniel Products) was added. (The Stromer viscosity of the SL630 (in Krebs units) ranges from about 47–65.) This mixture was blended, stabilized, coated and cured as above. The resulting material had an angle of view between 30° and 40°.

It should be noted that other embodiments and variations of the disclosed invention will be apparent to those of ordinary skill in the art without departing from the inventive concepts contained herein. Accordingly, this invention is to be viewed as embracing each and every novel feature and novel combination of features present in or possessed by the invention disclosed herein and is to be viewed as limited solely by the scope and spirit of the appended claims.

What is claimed is:

1. A process for producing a light diffusing sheet material comprising the steps of:
   a. selecting a first optically clear material and a second optically clear material, wherein said first and second optically clear materials have a differential refractive index ($\Delta n$); and are immiscible in one another as measured at a temperature at which said first and second optically clear materials are at or near their liquefying point;
   b. dispersing said second optically clear material in said first optically clear material to form a mixture at said temperature, wherein said second optically clear material is broken up to form light dispersing particles in said first optically clear material; and
   c. forming a solid film from said mixture.

2. The process of claim 1 further comprising the step of orienting said film to impart asymmetric optical properties to said film.

3. The process of claim 1 wherein said first and second optically clear materials have a viscosity ratio between 0.05 and 10 as measured at said temperature.

4. The process of claim 1 wherein said film forming step occurs by casting.

5. The process of claim 1 wherein said film forming step comprises extruding said mixture through a sheet die to form said sheet material.

6. The process of claims 1, 4 or 5 wherein said film is stretched to impart an asymmetry to said light dispersing particles.

7. The process of claim 5 further comprising the step of stretching said film as it exits said die.

8. The process of claim 1 wherein the average size of said light dispersing particles is from about 1 to 50$\mu$.

9. The process of claim 1 wherein the average particle size of said light dispersing particles is from about 5 to 30$\mu$.

10. The process of claim 1 wherein the average particle size of said light dispersing particles is from about 5 to 15$\mu$.

11. The process of claim 5 wherein said sheet is stretched in the machine direction by pulling said film through a take up roll operating faster than the speed at which the film exits from said die.

12. The process of claim 1 wherein said film forming step comprises further polymerizing said mixture.

13. The process of claim 1 wherein forming a solid film from said mixture comprises further polymerizing said first optically clear polymer.

14. The process of claim 1 wherein forming a solid film from said mixture comprises further polymerizing said second optically clear polymer.

15. The process of claims 12, 13 or 14 wherein said further polymerization is accomplished by UV irradiation.

16. The process of claim 1 wherein said film forming step further comprises orienting said dispersed second polymer in the machine direction by extruding said polymer mixture and forcing it through a die.

17. The process of claim 1 wherein said first and said second optically clear materials are chemically or physically polymerized.

18. The process of claim 1 wherein $\Delta n$ is about 0.2–0.005.

19. The process of claim 1 wherein $\Delta n$ is about 0.1–0.007.

20. The process of claim 1 wherein said first and second optically clear materials have an interfacial surface energy between $1 \times 10^{-4}$ and $1 \times 10^{-2}$ N/m.

21. A light diffusing sheet material made by the process of:
   a. selecting a first optically clear material and a second optically clear material, wherein said first and second optically clear materials have a differential refractive index ($\Delta n$); and are immiscible in one another as measured at a temperature at which said first and second optically clear materials are at or near their liquefying point;
   b. dispersing said second optically clear material in said first optically clear material to form a mixture at said temperature, wherein said second optically clear material is broken up to form light dispersing particles in said first optically clear material; and
   c. forming a solid film from said mixture.

22. The light diffusing sheet material of claim 21 which is rendered asymmetric by stretching to impart an asymmetry to said light dispersing particles.

23. The light diffusing sheet material of claim 22 wherein said first and second optically clear materials have a viscosity ratio between 0.05 and 10 as measured at said temperature.

24. The light diffusing sheet material of claim 22 wherein said optically clear materials are selected from the group consisting of polyesters, polyamides, polyolefins, polystyrenes, acrylics, silicones, epoxies, polyurethanes and silicones.

25. The light diffusing sheet material of claim 22 having an angle of view of the material before orientation of at least 60°.

26. The light diffusing sheet material of claim 22 having an angle of view of the material after orientation of at least 60°.

27. The light diffusing sheet material of claim 22 wherein the asymmetry after the orientation process is at least 2:1.

28. The light diffusing sheet material of claim 21 wherein $\Delta n$ is about 0.2–0.005.

29. The light diffusing sheet material of claim 21 wherein $\Delta n$ is about 0.1–0.007.

30. The light diffusing sheet material of claim 21 wherein said first and second optically clear materials have an interfacial surface energy between $1 \times 10^{-4}$ and $1 \times 10^{-2}$ N/m.

* * * * *